No. 880,475. PATENTED FEB. 25, 1908.
J. BAER.
MACHINE FOR MAKING BRUSHES.
APPLICATION FILED MAY 15, 1901.
6 SHEETS—SHEET 1.
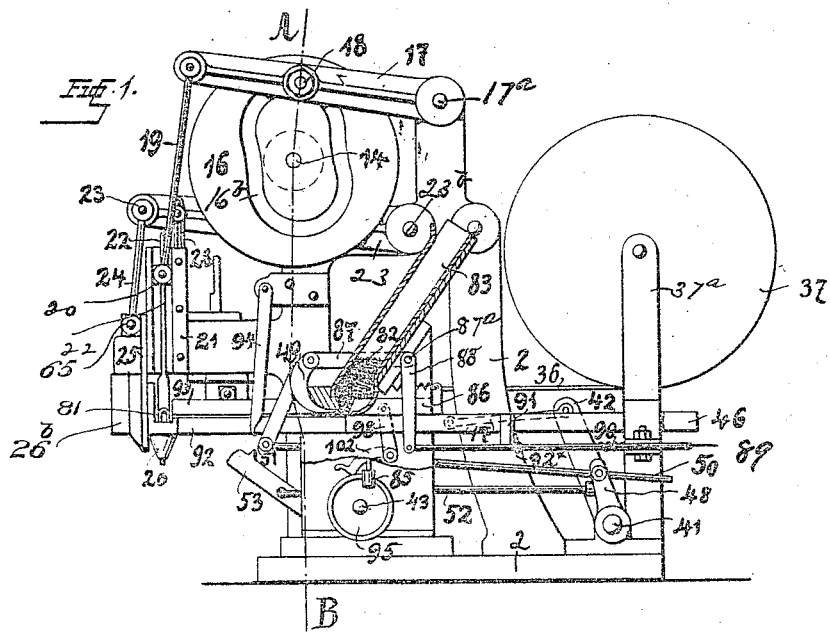

No. 880,475. PATENTED FEB. 25, 1908.
J. BAER.
MACHINE FOR MAKING BRUSHES.
APPLICATION FILED MAY 15, 1901.

6 SHEETS—SHEET 2.

Fig. 3.

INVENTOR
Josef Baer

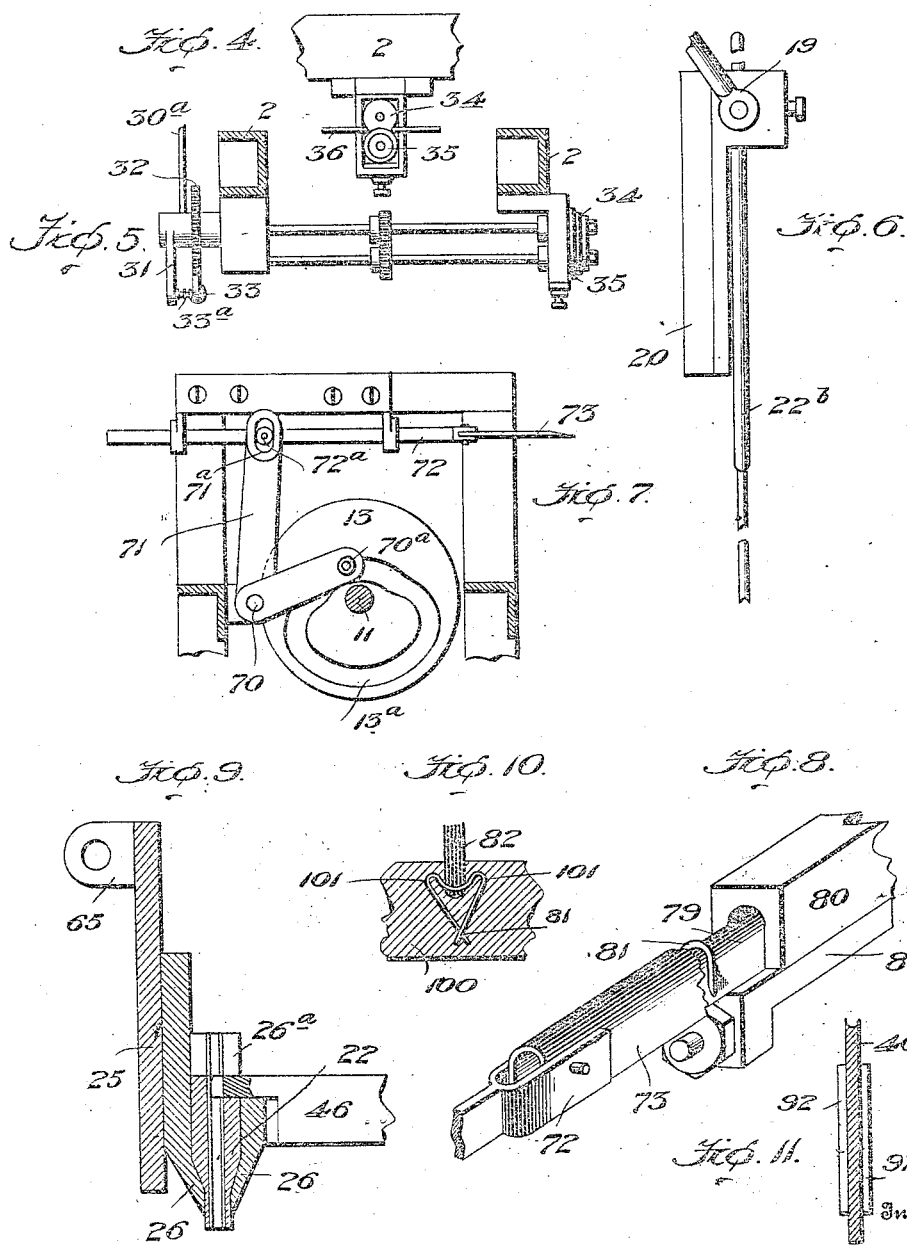

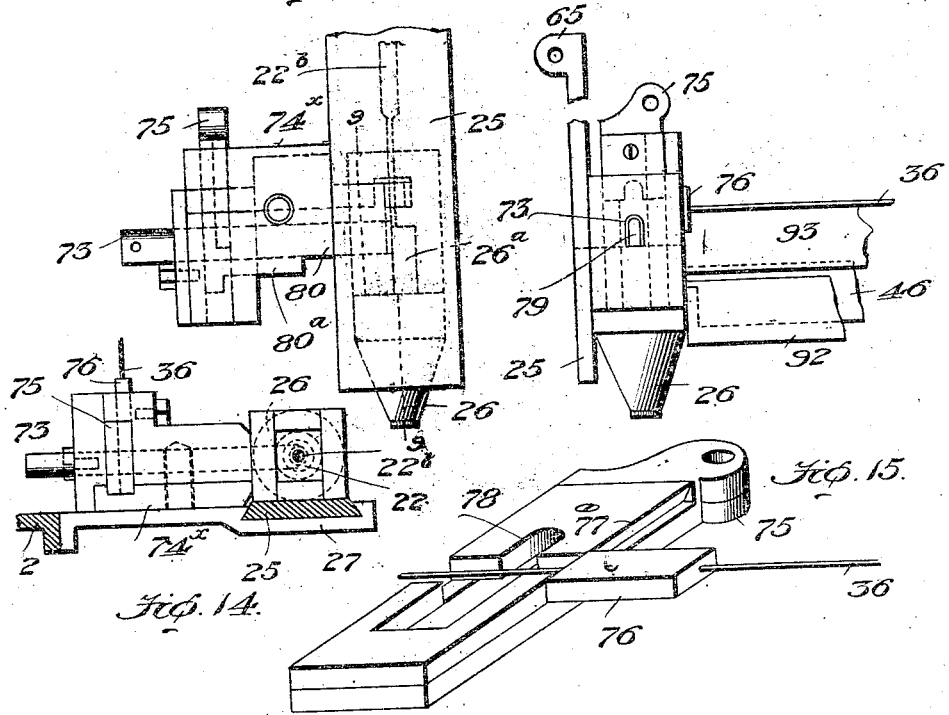

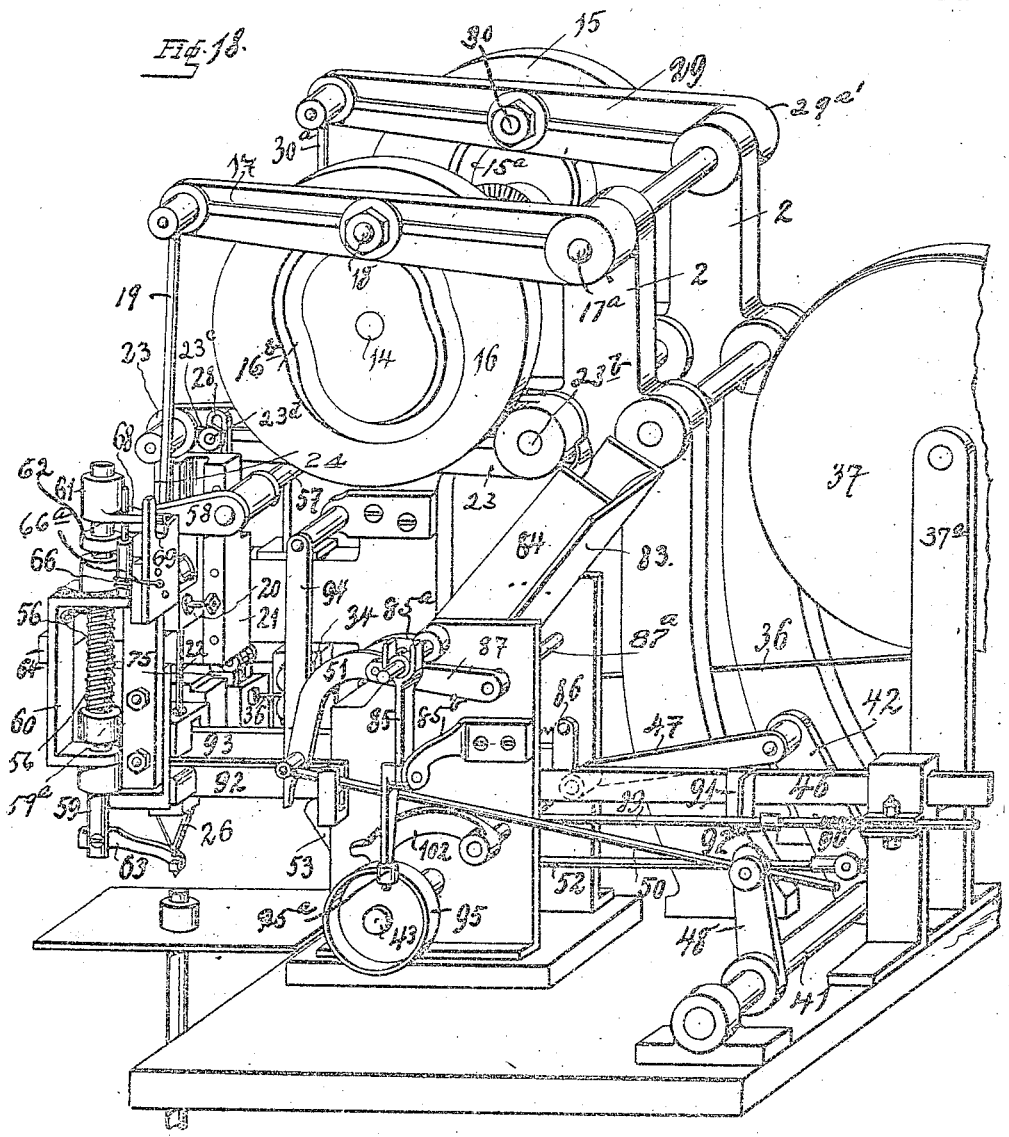

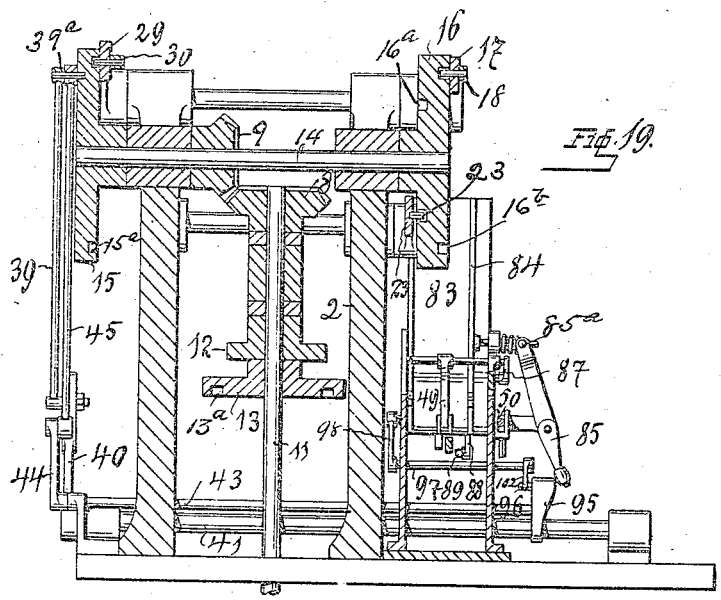

UNITED STATES PATENT OFFICE.

JOSEF BAER, OF WEINGARTEN, GERMANY, ASSIGNOR TO CHARLES POULET, OF LIEGE, BELGIUM.

MACHINE FOR MAKING BRUSHES.

No. 880,475.　　　　　Specification of Letters Patent.　　　　　Patented Feb. 25, 1908.

Application filed May 15, 1901. Serial No. 60,391.

*To all whom it may concern:*

Be it known that I, JOSEF BAER, a subject of the King of Würtemberg, and resident of Weingarten, in the Kingdom of Würtemberg and Empire of Germany, have invented certain new and useful Improvements in Machines for Making Brushes, of which the following is a specification.

This invention relates to improvements in brush making machines and the novelty resides in the peculiar construction and combination of parts hereinafter more fully described and then particularly pointed out in the appended claims.

The invention is illustrated in the accompanying drawings, in which,

Figure 1 shows a side elevation of the upper part of the machine with the indicator removed and partly in section. Fig. 2 is a front elevation of the upper part of the machine showing portions partly broken away. Fig. 3 is a side view of the whole machine with portions partly broken away. Fig. 4 is a side view of the wire feeding mechanism. Fig. 5 is a front view of parts shown in Fig. 4. Fig. 6 is a view of the staple and tuft inserting plunger. Fig. 7 is a cross section on the line 7—7 of Fig. 2, looking in the direction of the arrows. Fig. 8 is a perspective view of the staple guide. Fig. 9 is a longitudinal section on the line 9—9 of Fig. 12 of the nozzle with guide and view of the tuft transferring slide. Fig. 10 is a vertical section of the brush-stock. Fig. 11 is a top view of the tuft transferring slide, and its guide. Fig. 12 shows the mechanism for bending and cutting off the wire. Fig. 13 is a front view of the parts shown in Fig. 12. Fig. 14 is a plan view with parts in section of part of the mechanism shown in Fig. 12. Fig. 15 is a perspective view of the wire bender and cutter. Fig. 16 is an end view of the bristle feeding mechanism. Fig. 17 is a side view of the parts shown in Fig. 16. Fig. 18 is a perspective view looking at one side of the machine. Fig. 19 is a vertical section on the line A—B Fig. 1. Fig. 20 is a vertical section on the line C—D of Fig. 2. Fig. 21 is a detail of the nozzle-slide and its link.

In these drawings similar reference characters indicate the same parts whenever used.

Referring by these reference characters to the drawings, the numeral 1 designates the lower portion of the frame, and 2 the upper portion, as shown more clearly in Fig. 3.

In the frame 1 is journaled the main operating shaft 3 which derives its motion from a pulley 4, preferably loose on the shaft and designed to be connected therewith and disconnected therefrom by suitable clutch mechanism, in this instance a beveled clutch disk 5, under tension of a spring $5^a$ and operated by levers 6 and 7 from any suitable source. The rotary motion of shaft 3 is transmitted to a vertical shaft 11 through bevel gears $10^a$ and 10, and this vertical shaft 11 drives the various parts of the machine by means of bevel gear 8 and cams 12 and 13, all on said vertical shaft 11, in the manner hereinafter described. The bevel gear 8 meshes with a bevel gear 9 fast on a horizontal shaft 14 journaled in the upper frame, and on this shaft are secured two cams 15 and 16. The cam 16 has cam grooves $16^a$ and $16^b$ in its opposite faces as indicated in Fig. 19.

A lever 17 pivoted at $17^a$ to the frame 2 is provided with a pin or like projection at 18 which travels in the cam groove $16^b$ as clearly shown in Figs. 1 and 19. A rod or pitman 19 is pivoted at one end to the free end of lever 17, the lower end of said pitman being connected to a slide 20 moving vertically in a guide 21, the slide in turn being connected to and operating the tuft and staple inserting plunger 22 through the medium of its stem $22^b$ hereinafter more fully described.

The cam groove $16^a$ hereinbefore referred to is engaged by a pin $23^a$ on a lever 23 pivoted at $23^b$ to the frame 2 whereby the lever is operated in a manner similar to the lever 17. The free end of this lever 23 is connected by a link 24 with a slide 25 bearing a nozzle 26 (see Figs. 1 and 2) the slide 25 being guided by the guide 27 in which it slides. A slotted bar 28 is also connected to the lever 23 by means of the arm $23^c$ and pin $23^d$ (see Fig. 18), which slotted bar operates the mechanism for bending and cutting off the wire as hereinafter described in detail.

A lever 29, pivoted at $29^{a'}$ is operated by the cam 15 by its pin 30 engaging the groove $15^a$ of the cam. The free end of this lever is connected by a link or rod $30^a$ with one arm of a bell crank lever 31, the other arm $f$ of which carries a pawl 33 adapted to engage the teeth of a ratchet wheel 32 (see Fig. 3) by which an intermittent motion is imparted to the feed rolls 34 and 35 which draw off or feed the wire 36 as shown in detail in Figs. 4 and 5. The wire as shown is wound on a drum or reel 37 journaled in standards $27^a$. The pawl 33 is held elevated by means of a spring $33^a$ acting against its under side as seen in Fig. 3. To a pin $39^a$ carried by the outer face of the cam 15 are pivotally connected two rods or links 39 and 45. Rod 45 is pivotally connected to a crank arm 44 on the shaft 43 and rod 39 is pivotally connected to a crank 40 on shaft 41.

The shaft 41 carries an arm 42 (see Fig. 1) which has a link connection 47 by which a reciprocating movement is imparted to the slide 46. Said shaft 41 also carries an arm 48 which is connected by a rod or link 50 with an arm 51 by which rocking or oscillating movement is imparted to the curved tuft separator 49 as shown more clearly in Figs. 1 and 18. Connected with the arm 42 is a bar or rod 52 which transmits motion to the pivoted arm 53.

The cam disk 12 has a notch 54 adapted to be engaged by a lever arm 55 carried by a shaft 57 which carries an arm 58. This arm has an end or portion extending between two rings or collars 61 and 62 fast on a rod 59 which is mounted to slide vertically in orificed lugs on the guide 27. Between the said lugs the rod 59 passes through the openings in the horizontal arms of a frame 60. The rod 59 is free to move longitudinally in the frame 60 but is non-rotatable with respect thereto. A spring 56 encircles said rod 59 and bearing against a collar $59^a$ thereon tends to keep said rod normally depressed. On the lower part of this rod 59 is carried an index 63.

Secured to the frame 60 is a bar or projection 64 which has an angularly turned portion provided with an inclined edge or face portion as shown in the detail view Fig. 21. The upper end of the slide 25 to which the rod 24 is connected is extended laterally in the form of a lug 65, (see Fig. 21) so that as the slide moves downwardly this lug will engage the cam projection 64, and thus the frame 60 will be swung slightly in a horizontal plane on a vertical axis, and against the tension of the spring 66. This spring encircles an upright $66^a$ which passes through an arm 68 extending from the ring or collar 61 and has one end connected to said frame 60 and the other end to guide 69 so that the rotary movement places the spring under tension. The rotary movement of the arm 68 is limited by a stationary guide 69 (Fig. 18).

A bell crank lever 71 pivoted at 70, has a pin or projection $70^a$ which engages the cam groove $13^a$ of the cam 13 (see Fig. 7). The other arm of this bell crank lever has a slotted portion $71^a$ which is engaged by a pin or projection $72^a$ on the bar 72 which is connected with a member 73 of inverted U-shape, as shown in Fig. 8. This member 73 moves in and coöperates with the bending and cutting mechanism, which will now be described (see more especially Figs. 12 and 15), $74^\times$ is a frame or plate, secured to the guide 27 as best seen in Fig. 14.

The numeral 75 designates a cutter and presser slidable in the frame or plate $74^\times$ and which is actuated by the bar 28, and which moves at right angles to the wire guide 76 and shears off a proper length of wire by the action of the edge 77. This piece of wire is then pressed by the recessed portion 78 over a former 79 which extends horizontally through and is fixed in a recessed guide 80 carried by a bracket $80^a$, see Fig. 8.

When the wire is cut off the slide 73 is drawn back. When the loop or staple 81 is formed over the former, then the slide 73 which passes over the former, brings it in front of the socket $26^a$ of the nozzle 26 when it drops from the saddle 79, when it is forced down by the plunger 22.

83 is a receptacle for bristles 82, said receptacle has a movable side wall 84 which is reciprocated by means of a pivoted lever 85 which is pivoted between its ends to an arm on the machine frame and is pivotally connected at its upper end with the slidable rod $85^a$ secured to the said side wall 84. An expansion spring surrounds said rod $85^a$ between its bearing in the machine frame and the lever 85 and by its expansion tends to draw the movable side 84 away from the bristles. The opposite end of lever 85 is provided with a roller $95^a$ which contacts with a cam face on a wheel 95 secured to the shaft 43. On rotation of the said cam wheel the movable side 84 of the bristle receptacle is alternately driven against the ends of the bristles by the cam 95 and withdrawn from contact therewith by the spring 85. This reciprocation of the movable slide 84 keeps the ends of the bristles 82 even. A slide 86 is reciprocable through a slot in the lower rear portion of the bristle receptacle 83. This slide is actuated by an arm 98 on a rock shaft 97. The shaft 97 is rocked by an arm 102 having a pin 96 which enters a cam slot in the cam wheel 95.

89 is a rod slidable in the machine frame and pushed toward the left of the machine as shown in Figs. 1 and 18 by the expansion of a spring 90. A stop 91 on the slide 46 contacting with a collar $92^\times$ on the slide rod 89 moves the said rod against the spring 90. The end of rod 89 is pivoted to an arm 88 on a rock shaft 87. An arm 87 on this rock shaft is pivoted to the upper portion of the bristle separator 49 and in connection with rod 50 operates the same to separate the tufts of bristles from the mass of bristles in receptacle 83. 92 and 93 are parallel horizontal bars spaced apart and between them the bristles are transferred by the slide 46 from the bristle receptacle to the stapling and setting mechanism. The parallel bars 94 swing loosely in front of the tuft of bristles as the said tuft is transferred and serve to keep the tuft compacted during its transfer. 100 is the brush stock and 101 designates the extensions of the staple.

The tuft-transferring slide 46, shown clearly in Figs. 1, 9, 11 and 13 is mounted for reciprocation, and at the place where the bristles enter into the conical guide this slide serves by means of its notch on the side of the cut out part of the socket of the nozzle as a guide for the staple 81, and for the plunger 22.

The operation of the machine is as follows: The bristles 82 are placed in the receptacle 83 and the side wall 84 is reciprocated against one end of the bristles thus serving to keep their ends even and to keep them loosened up so that they may constantly fall toward the bottom of the chute. The shaking slide 86 is actuated to further loosen the bristles and to feed them positively toward the forward, lower end of the chute where they may be acted upon by the tuft separator 49. The tuft-separator 49 is now raised by means of the levers 87 and 88. When the tuft-separator 49 is raised, it pushes by means of lever 51 through the medium of the bar 50 between the bristles and separates a bunch. This bunch is thus deposited in front of the tuft-transferring slide 46 and is pushed forward thereby moving between the bars 92 93. Two loosely suspended parallel bars 94, Fig. 1, keep the bunch of bristles compact and prevent its separating until it lies in the nozzle 26. At the same time a piece of wire 36 has been cut off by the cutter 77, and by the aid of the recess 78 of the part 75 pressed over the saddle 79. The slide 73 now guides the staple 81 through the groove in the guide 80 until it is under the plunger 22 exactly over the bristles (Figs. 10 and 12). The plunger is now pressed down and pushes the staple 81 and the bristles through the nozzle 26. This nozzle is provided with a cone-shaped lower portion seen best in Fig. 9. The notch in the forward end of the slide 46 (see Fig. 11) serves as a guide to let in the staple (see Fig. 9). When the loop is put into the brush stock 100, the ends are forced in and the bristles held firm in the manner of a hook. The extensions 101 of the loop are likewise pressed into the wood so that the bristles are so firmly held that it is impossible to pull them out by hand. The brush stock 100 is moved by the operator himself, 74 is an indicator on the machine. The pressure of the spring 56 always keeps the indicator in the lowest position directly under the nozzle, and this position is to be adjusted when the first hole is filled, the indicator being first placed in the hole and then the machine set in motion. When the cam 12 revolves the lever 55 is pressed up, the bar 57 and the crank 58 turned up so that the indicator comes into its highest position. If now the nozzle goes down, the projection 65 of its slide presses on the sloping edge of the plate 64 so that the box 60 turns axially on the rod 59 as its axis. When the first hole is filled, the operator moves the stock; the indicator marks out the hole and the pusher bar fills it. The stock 100 can be turned any way so that the holes can be placed in various positions without the method of operation being altered.

Having thus described my invention, what I claim is:

1. In a machine of the class described, a bristle receiver having a movable side, means for actuating said movable side for loosening the bunch, a tuft separator, and means for pushing the separated tuft forward.

2. In a machine of the class described, a bristle receiver having a movable side, means for keeping the tuft of bristles compact and preventing separation thereof, a nozzle with a cone-shaped lower end, means for actuating said movable side and means for pushing the separated tuft forward.

3. In a machine of the class described, a bristle receiver having a movable side, means for keeping the tuft of bristles compact and preventing separation thereof, a nozzle with a cone-shaped lower end, means for actuating said movable side and means for pushing the separated tuft forward, a tuft separator and means for placing a staple over each tuft before they are driven through each nozzle.

4. In a machine of the class described, a bristle receiver having a movable side, means for actuating said movable side for loosening the bunch, a tuft separator, means for pushing the separated tuft forward, and means for keeping the bunch of bristles compact and preventing its separating.

5. In a machine of the class described, a bristle receiver having a movable side, means for actuating said movable side for loosening the bunch, a tuft separator, means for pushing the separated tuft forward, means for keeping the bunch of bristles compact and preventing its separating, a nozzle with a cone-shaped lower end a plunger, and means for guiding a staple beneath the plunger and over the bristles.

6. In a machine of the class described a bristle receiver having a movable side, means for actuating said movable side for loosening the bunch, a tuft separator, means for actuating the tuft separator, means for keeping the bunch of bristles compact and preventing its separating and means for pushing the separated tuft forward, a nozzle having a cone-shaped lower portion, means for placing a staple above each tuft of bristles before they are forced through the nozzle, and means for driving the bristles and staple through said nozzle.

In witness whereof I have hereunto set my hand in presence of two witnesses.

JOSEF BAER.

Witnesses:
 HR. REICKARDT,
 Y. L'ADMIRANCE.